US009567890B2

(12) United States Patent
Schmitt et al.

(10) Patent No.: US 9,567,890 B2
(45) Date of Patent: Feb. 14, 2017

(54) INTERNAL COMBUSTION ENGINE WITH EXHAUST AFTERTREATMENT AND ITS METHOD OF OPERATION

(75) Inventors: Julien Schmitt, Kuntzig (FR); Michael Parmentier, Chatillon (BE)

(73) Assignees: Delphi International Operations Luxembourg S.A.R.L., Luxembourg (LU); Honda Motor Co., Ltd., Tokyo (JP)

( * ) Notice: Subject to any disclaimer, the term of this patent is extended or adjusted under 35 U.S.C. 154(b) by 666 days.

(21) Appl. No.: 13/997,771

(22) PCT Filed: Jan. 7, 2011

(86) PCT No.: PCT/EP2011/050158
§ 371 (c)(1),
(2), (4) Date: Jun. 25, 2013

(87) PCT Pub. No.: WO2012/092974
PCT Pub. Date: Jul. 12, 2012

(65) Prior Publication Data
US 2013/0289857 A1    Oct. 31, 2013

(51) Int. Cl.
*F01N 3/00* (2006.01)
*F01N 9/00* (2006.01)
(Continued)

(52) U.S. Cl.
CPC .............. *F01N 9/00* (2013.01); *F01N 11/005* (2013.01); *F02D 41/024* (2013.01); *Y02T 10/26* (2013.01)

(58) Field of Classification Search
USPC .......... 60/274, 276, 284, 285, 286; 703/7, 8
See application file for complete search history.

(56) References Cited

U.S. PATENT DOCUMENTS 5,938,715 A * 8/1999 Zhang ................. F01N 3/32
60/277
5,950,422 A * 9/1999 Dolling .............. B01D 53/8625
60/274

(Continued)

FOREIGN PATENT DOCUMENTS

CN          101649765 A       2/2010
DE     10 2004 033 394 B3    12/2005

(Continued)

OTHER PUBLICATIONS

International Search Report dated Oct. 18, 2011.

*Primary Examiner* — Binh Q Tran
(74) *Attorney, Agent, or Firm* — Joshua M. Haines

(57) ABSTRACT

A method of operating an internal combustion engine is proposed, the engine comprising an exhaust system with a DOC and a DPF and, downstream thereof a SCR catalyst. The ECU is configured to allow operation in at least one of a normal mode and a heat-up mode. A predicted temperature evolution of said second exhaust after treatment means is regularly determined based on a thermal model taking into account the thermal inertia of the exhaust system and having as input the current temperatures of the DOC/DPF and SCR. The predicted temperature evolution of SCR is indicative of the temperature that the SCR may reach during a simulated time period in case the operating mode. The engine operating mode is changed depending on the predicted temperature evolution.

14 Claims, 5 Drawing Sheets

(51) Int. Cl.
*F01N 11/00* (2006.01)
*F02D 41/02* (2006.01)

(56) References Cited

U.S. PATENT DOCUMENTS

| | | | |
|---|---|---|---|
| 7,054,734 B2 | 5/2006 | Todoroki et al. | |
| 7,243,491 B2 | 7/2007 | Okugawa et al. | |
| 8,418,441 B2 * | 4/2013 | He | F01N 3/0253 60/274 |
| 8,468,802 B2 | 6/2013 | Mueller | |
| 8,490,388 B2 | 7/2013 | Parmentier et al. | |
| 8,621,845 B2 * | 1/2014 | Gonze | F01N 3/103 60/282 |
| 8,621,849 B2 * | 1/2014 | Vernassa | F01N 3/103 60/286 |
| 8,631,645 B2 * | 1/2014 | Gonze | F01N 3/101 60/285 |
| 8,857,157 B2 * | 10/2014 | Hamama | F01N 9/00 60/285 |
| 2005/0228572 A1 | 10/2005 | Mansbart | |
| 2005/0241301 A1 | 11/2005 | Okugawa et al. | |
| 2005/0284131 A1 | 12/2005 | Forthmann et al. | |
| 2007/0186541 A1 | 8/2007 | Haft | |
| 2009/0217645 A1 | 9/2009 | Sisken et al. | |

FOREIGN PATENT DOCUMENTS

| | | |
|---|---|---|
| EP | 1 179 667 B1 | 7/2001 |
| EP | 1582709 A3 | 3/2007 |
| EP | 2031217 A1 | 3/2009 |
| EP | 2159392 A1 | 3/2010 |
| JP | 2001-349230 A | 12/2001 |
| JP | 2002-47974 A | 2/2002 |
| JP | 2002-242665 A | 8/2002 |
| JP | 2004-300943 A | 10/2004 |
| JP | 2005-48678 A | 2/2005 |
| JP | 2005-240672 A | 9/2005 |
| JP | 2006-90147 A | 4/2006 |
| JP | 2009-250135 A | 10/2009 |
| JP | 2010-43617 A | 2/2010 |
| WO | 2004/055346 A1 | 7/2004 |
| WO | 2008/050051 A1 | 5/2008 |
| WO | 2008/062119 A1 | 5/2008 |

* cited by examiner

INTERNAL COMBUSTION ENGINE WITH EXHAUST AFTERTREATMENT AND ITS METHOD OF OPERATION

CROSS REFERENCE TO RELATED APPLICATIONS

This application is a national stage application under 35 U.S.C. 371 of PCT Application No. PCT/EP2011/050158 having an international filing date of 7 Jan. 2011, the entire disclosure of which is hereby incorporated herein by reference.

FIELD OF THE INVENTION

The present invention generally relates to internal combustion engines equipped with exhaust aftertreatment devices. It more specifically relates to the control of an engine equipped with an oxidation catalyst and a NOx treatment device such as a SCR catalyst.

BACKGROUND OF THE INVENTION

Current emission control regulations necessitate the use of exhaust aftertreatment systems in order to reduce the concentration of combustion byproducts and/or products of incomplete combustion.

Spark ignition (i.e., gasoline) engines conventionally use three-way catalytic converters to satisfy emissions regulations. Compression ignition (i.e., diesel) engines, however, are typically equipped with two-way catalytic converters (also referred to as Diesel Oxidation Catalyst—DOC), which may not efficiently reduce nitrogen oxides (NOx). Accordingly, diesel engines may include a reductant-based selective catalytic reduction (SCR) device in order to seek reduction in NOx, often the most abundant and polluting component in exhaust gases. In addition, diesel engines may also include diesel particulate filters (DPF) for particulate matter control.

Urea-based SCR catalysts use gaseous ammonia as the active NOx reducing agent. Typically, an aqueous solution of urea, also known as carbamide (($NH_2$)$_2$CO), is carried on board of the vehicle, and an injection system is used to supply it into the exhaust gas stream entering the SCR catalyst where it decomposes into gaseous ammonia ($NH_3$) and is stored in the catalyst. The NOx contained in the engine exhaust gas entering the catalyst then reacts with the stored ammonia, which produces nitrogen and water. It is worth noting that to attain the conversion efficiency required to achieve the emission limits, the SCR-catalyst must be at least at a predetermined temperature known as light off temperature.

In an engine's exhaust system, the SCR catalyst is conventionally placed downstream of other exhaust after-treatment means, namely the catalytic converter and possibly a particulate filter.

One of the challenges in such exhaust line with serially mounted exhaust aftertreatment devices is its thermal management. In the above case of an exhaust line comprising, in series, an oxidation catalyst, a particulate filter and a SCR catalyst, the catalytic elements should reach their respective light off temperature as early as possible.

But the SCR catalyst is usually the last treatment component in the exhaust line and the most remote from the engine exhaust valves. In addition, each component in the exhaust line has a thermal inertia, whereby the temperature increase of components situated further away from the engine is delayed as compared to those near the engine. Thermal losses in the exhaust pipe itself are also to be taken into account. FIG. 1 illustrates a typical temperature trace, in a diesel engine, for each of the diesel oxidation catalyst (DOC), the diesel particulate filter (DPF) and the SCR catalyst.

As can be seen, the temperature of the SCR catalyst is heavily dependent on the thermal behavior of the other components in the exhaust line. In order to heat-up the catalysts as soon as possible, the engine is normally operated in a heat-up mode by acting on engine control parameters to heat-up the temperature of engine-out gases or by injecting fuel in the exhaust line that is burned in the DOC. Such heat-up strategy is e.g. described in US 2009/0217645.

The heat-up mode may be triggered from engine start up. Conventionally the thermal management is then carried out by monitoring the current temperature of the SCR catalyst; and the heat-up mode is stopped as soon as the target temperature in the catalyst is reached, e.g. the light off temperature.

Unfortunately, under such control conditions the DOC gets very hot, while at the same time the SCR is still relatively cool due to thermal inertia of the components in the exhaust line. As can also be understood from FIG. 1, when the heat-up mode is stopped at, e.g., a light off temperature $T_{LO}$ of 250° C. measured in the SCR-catalyst, the thermal inertia in the system leads to an overshoot in the SCR temperature $T_{SCR}$ above 300° C. Such high temperatures are not required for NOx conversion and thus reflect a waste of fuel to heat-up the exhaust line.

OBJECT OF THE INVENTION

Hence, there is a need for an improved method of operating an internal combustion engine comprising an exhaust system with an exhaust aftertreatment device such as an SCR-catalyst.

SUMMARY OF THE INVENTION

The present invention concerns a method for operating an internal combustion engine comprising an exhaust system as claimed in claim 1.

The exhaust system comprises first exhaust aftertreatment means and, downstream thereof, second exhaust aftertreatment means; and the engine comprises an ECU configured to allow engine operation in at least one of a normal mode and a heat-up mode.

As it will be understood by those skilled in the art, the normal mode and a heat-up mode result from a given control of engine combustion to achieve a certain result in the exhaust system. The normal mode may for example correspond to engine settings designed to optimize emissions and fuel consumption. The aim of the heat-up mode is to increase the temperature in the exhaust system and hence of the exhaust aftertreatment means, i.e. to perform the "thermal management" of the exhaust line. When these engine combustion modes (normal/heat-up) are controlled in a coordinate manner with respect to the second exhaust aftertreatment means, they may be said to be associated therewith. In heat-up mode, any appropriate measures may be taken that result in an increase in the temperature of the exhaust gases arriving at the second exhaust aftertreatment means (as compared to normal mode), namely by acting on engine settings/control parameters to heat-up the temperature of engine-out gases or by injecting fuel in the exhaust line that is burned in the DOC.

According to the present invention, a predicted temperature evolution of the second exhaust aftertreatment means is regularly determined based on a thermal model taking into account the thermal inertia of the exhaust system and having as input the current temperatures of the first and second exhaust aftertreatment means. The predicted temperature evolution of the second exhaust aftertreatment means is indicative of the temperature that the second exhaust aftertreatment means would reach during a simulated time period ahead of the current time, in case the operating mode was changed. This simulated time period starts at the current time and has a predetermined simulated duration, preferably substantially greater than the time required to perform the simulation. The operating mode (heat-up or normal) may then be changed depending on the predicted temperature evolution.

The method according to the present invention hence takes into account the current conditions and the thermal inertia of the treatment elements in the exhaust line to predict future temperatures. This simulation of predicted temperatures is however carried out on the hypothesis of a change in the operating mode. For example, if the engine was operated in heat-up mode to increase the temperature of the second exhaust aftertreatment means, the thermal model determines the predicted temperature evolution supposing that the heat-up mode is stopped and that engine is operated in normal mode. With this method, it is thus possible to stop the fuel-consuming heat-up mode as soon as possible, and at the same time warrant that the second aftertreatment means will operate at the required temperature.

In doing so, the obtained predicted temperatures (i.e. temperatures within the predicted temperature evolution) may be compared to an upper temperature threshold and the heat-up mode may be stopped when it is determined that the predicted temperature has reached or exceeds such upper temperature threshold.

Similarly, the present method may be used to determine the point of time at which operation in normal mode should be switched to "heat-up" mode to avoid a drop of temperature below a predetermined temperature. Again, this may be carried out by comparing the obtained predicted temperature to a lower temperature threshold and engine operation may be switched from normal to heat-up mode, when it is determined that the predicted temperature has reached or dropped below such lower temperature threshold.

Such upper and lower threshold temperatures may be determined by calibration. Their selection implies a compromise between fuel consumption and conversion efficiency, but the thresholds should preferably ensure a sufficient overall NOx conversion efficiency; in practice those thresholds may be different but relatively close to the light off temperature. As it will be understood, these upper and lower thresholds allow apprehending the heat-up speed behaviour of the SCR catalyst.

Preferably, the thermal model uses a respective, predetermined steady-state temperature of the exhaust line that is associated with each operating mode. The steady-state temperature may be representative of the steady state temperature of one component of the exhaust line, preferably the second exhaust aftertreatment means. This input is a hypothesis on the long-term temperature of the second exhaust aftertreatment means and one limit condition for the calculations. For speed and ease of implementation, first-order lag filter models are preferred.

The present method proves particularly interesting for the thermal management of an engine's exhaust system comprising an oxidation catalyst and/or a particulate filter as first exhaust aftertreatment means and, downstream thereof, a SCR-catalyst as second exhaust aftertreatment means.

According to another aspect, the present invention also concerns an internal combustion engine comprising an exhaust system with exhaust aftertreatment means.

It remains to be noted that while the present invention has been developed with the aim of optimizing the thermal control of a SCR-catalyst in an engine exhaust system, the present invention may be applied to the thermal control of other types of exhaust aftertreatment devices located downstream in the exhaust line and affected by the thermal inertia of the exhaust system and heat produced upstream thereof.

As it will also appear to those skilled in the art, the present method may be implemented with more than two operating modes for the second exhaust aftertreatment means, e.g. there may be one normal mode and two heat-up modes corresponding to different heating strategies (e.g. a light off heat up mode and a running heat up mode).

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
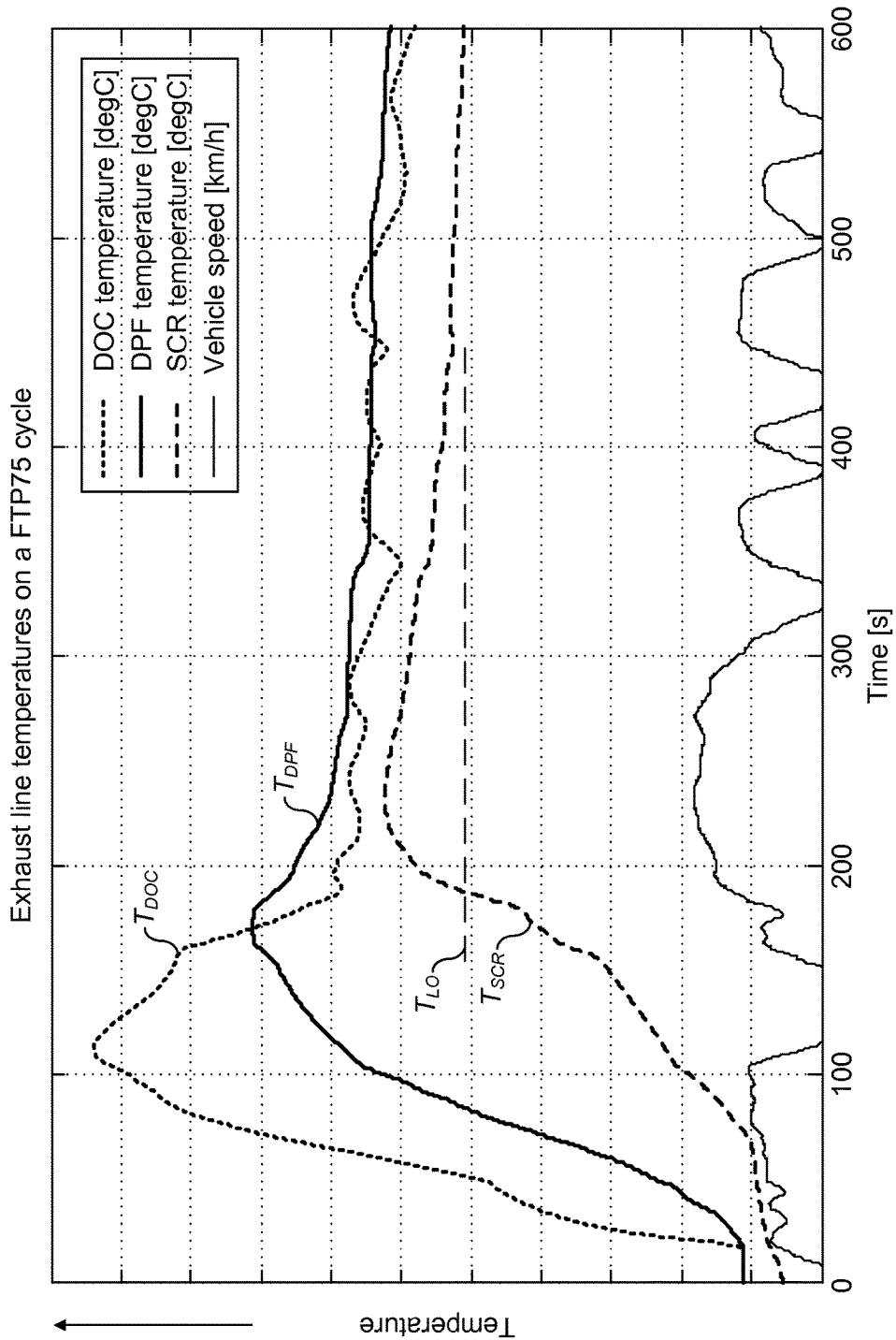
FIG. 1: is a graph showing temperature curves (vs. time) of a conventional mechanization for an SCR system during an FTP75 (or EPA III) emission cycle.

As explained with reference to FIG. 1 hereinabove, a simple temperature-based control of the SCR catalyst heat-up mode, wherein heating is stopped when it is measured that the SCR catalyst has reached its light off temperature, is not optimal since it typically leads to a temperature overshoot. This effect, due to the thermal inertia of the components in the exhaust line, implies excessive fuel consumption, while the higher temperature of the SCR catalyst is not even useful in terms of NOx conversion.

The present invention provides an optimized thermal control of exhaust aftertreatment means such as e.g. an SCR-catalyst in an engine exhaust line, wherein the SCR is located downstream of first exhaust aftertreatment means.

A preferred embodiment of this method will now be described with respect to FIGS. 2 to 5 as applied to a diesel internal combustion engine comprising an exhaust line with first exhaust aftertreatment means comprising a diesel oxidation catalyst (DOC) contiguous to a diesel particulate filter (DPF) and further downstream, second exhaust aftertreatment means taking the form of a SCR-catalyst.

In such exhaust line, the temperature of the SCR catalyst is heavily dependent on the thermal behavior of the other components in the exhaust line. Due to important thermal inertia, the heat is progressively transferred from the DOC to the SCR catalyst by the exhaust gas stream.

As already discussed above, a control based solely on the monitoring of the current temperature of the SCR-catalyst leads to an overshoot in temperature, due to thermal inertia of the components. As a matter of fact, in the SCR heat-up mode the DOC and DPF reach high temperatures (and thus accumulate heat) before the SCR actually reaches the light off temperature, indicated $T_{LO}$ in FIG. 1. The delayed thermal transfer then causes the temperature overshoot in the SCR-catalyst.

The present inventors have thus observed that due to this thermal inertia of the components located upstream of the SCR catalyst, it is possible to stop the heat-up mode at a certain moment, even if the SCR is still cold, provided that the accumulated heat in the upstream components is sufficient to heat-up the SCR catalyst to its desired operating temperature (e.g. light off).

Accordingly, the present method uses a mathematical thermal model to determine whether, by stopping the heat-up mode at a certain point of time (preferably towards the end of the simulation), the heat accumulated in the exhaust line and produced will be sufficient to reach the desired operating temperature of the SCR-catalyst. For this purpose, the engine electronic control unit (ECU) comprises a so-called "real time predictor" designed to estimate the temperature value(s) in the SCR-catalyst during a certain time period of predetermined length ahead of the present time—referred to as simulated time period—if the heat-up mode was stopped (or more generally if the operating mode was changed). The resulting temperature value(s) may thus be used in the thermal control scheme of the SCR-catalyst. Actually, the extrema of the temperatures that the SCR-catalyst may reach during the future time period are of particular interest in this variant, as will be explained further below.

The type of suitable model to describe the thermal behavior of the exhaust line can be apprehended from the following mathematical approach.

In fact, for each component (i.e. for the DOC, the DPF and the SCR), there is an energy balance equation that can be expressed as:

$$\dot{m}_{gas} \cdot cp_{gas} \cdot T_{out} = \dot{m}_{gas} \cdot cp_{gas} \cdot T_{in} + m_{wall} \cdot cp_{wall} \cdot \frac{dT_{wall}}{dt}$$

where:

$\dot{m}_{gas}$ is the mass flow rate of the exhaust gas stream;

$cp_{gas}$ is the specific heat of the exhaust gas;

$T_{out}$ and $T_{in}$ are the respective outlet and inlet temperatures of the component;

$m_{wall}$ is the mass of the wall of the component, $cp_{wall}$ its specific heat and $T_{wall}$ its temperature.

This equation can be solved to provide the outlet temperature $T_{out}$, assuming that $T_{out}=T_{wall}$ (perfect gas-wall exchange).

This results in a first order filter of $T_{in}$ with a time constant that is a function of the exhaust flow:

$$\frac{m_{wall} \cdot cp_{wall}}{\dot{m}_{gas} \cdot cp_{gas}} \cdot \frac{dT_{out}}{dt} + T_{out} = T_{in}$$

which can further be expressed as $$\tau \cdot \frac{dT_{out}}{dt} + T_{out} = T_{in},$$

where $\tau$ represents the thermal inertia time constant.

Theoretically, the maximum predicted SCR temperature could then be mathematically solved but this would lead to a very complex form with 3 cascades of differential equations.

Therefore, the proposed solution is that of modeling the temperature of the SCR-catalyst depending on the current temperatures (i.e. the temperatures at the moment the simulation is started) of the components in the exhaust line, i.e. the current/actual temperatures of each of the DOC, the DPF and the SCR.

In addition, to be able to easily use a first order filter model for each component, a further input parameter to the thermal model preferably is a predetermined temperature that is selected by way of hypothesis as a steady state temperature (hereinafter noted $T_{SCR\ future}$) for the SCR and associated with a given engine operating mode (heat-up or normal). This temperature $T_{SCR\ future}$ is a hypothetical temperature that the SCR-catalyst would reach in either the "normal" or the "heat-up" mode under regular, steady state (or long-term) driving conditions. Although named "hypothetical", such temperature may be determined by calibration; it is only hypothetical in the sense that driving conditions may lead to a different value in fine.

Hence, the present inventors have found a way to avoid complex, resource-consuming calculations by using first-order lag filter models together with the long-term temperature hypothesis ($T_{SCR\ future}$), which renders the use of the present real-time predictor possible at industrial scale (i.e. using conventional engine computing resources). The reason for this approach is that since it is never possible to know the engine's behavior in the future (due to a sudden driver acceleration for example), it is preferable to keep the model as simple as possible, which can be achieved by means of the long-term SCR temperature together with the first-order lag filters and using realistic main inertia time constants for an efficient implementation.

As mentioned above, the long-term temperature value ($T_{SCR\ future}$) may be determined by calibration, e.g. by using average steady state conditions of an FTP emission cycle or any other predetermined cycle. Alternatively, the long-term temperature value may be determined from past average driving conditions that hence take into account the actual driving behavior of the driver. Those skilled in the art may further devise other ways of determining a suitable long-term temperature value that provides a hypothesis on the future, steady state SCR temperature.

Figure 2:
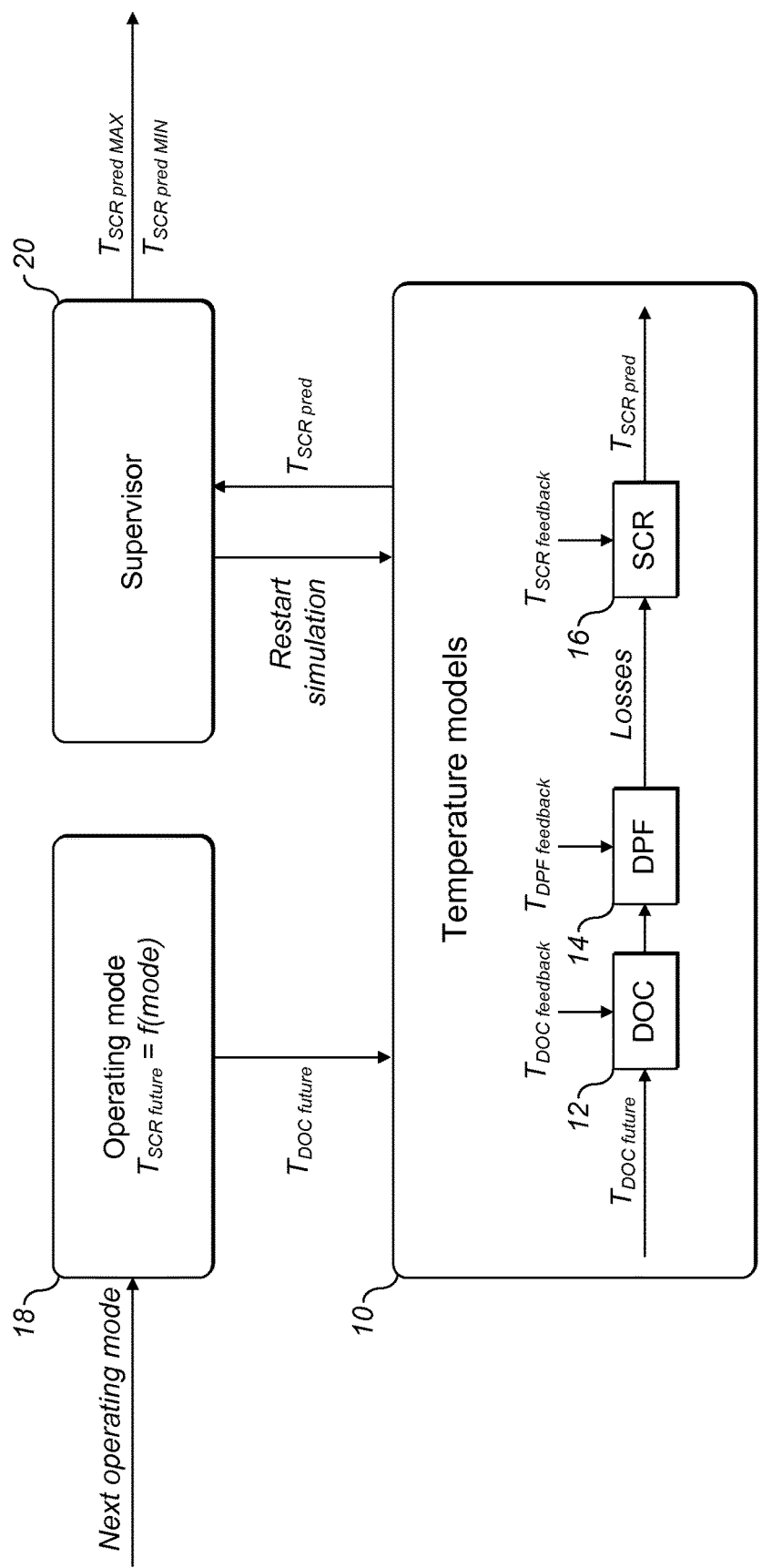
FIG. 2: is a block diagram of the thermal model used in the preferred embodiment of the present method.

Turning now to FIG. 2, box 10 contains:

a first order lag filter model for the DOC, indicated 12;

a first order lag filter model for the DOC, indicated 14;

a first order lag filter model for the SCR, indicated 16;

and a simplified thermal loss model for the exhaust pipe in between the DPF and the DOF, indicated Losses.

As explained, the thermal model 10 has four inputs: the current temperature of each component $T_{DOC\ feedback}$, $T_{DPF\ feedback}$ and $T_{SCR\ feedback}$. These temperatures may be measured or estimated by conventional methods. The fourth signal required for the models is the long-term temperature of the SCR, i.e. $T_{SCR\ future}$. As indicated above, this temperature depends on the operating mode of the SCR-catalyst. For example, it may be 280° C. in heat-up mode or 220° C. in normal mode.

However, while $T_{SCR\ future}$ is the predetermined temperature associated with the operating mode (box 18), the thermal model in box 10 starts with the temperature $T_{DOC\ future}$. Well, since the DOC and DPF may be considered to be at the same temperature, $T_{DOC\ future}$ may be considered to be equal to $T_{SCR\ future}$ plus the thermal losses ("Losses" in FIG. 2) in the exhaust pipe.

The resulting temperature, as calculated by the final model 16, is noted $T_{SCR\ Pred}$.

For each simulation phase, each sub-model may then be initialized with the measured temperature of the modeled component, ensuring that the stored energy of each component is taken into account. This is of advantage since the DOC and/or DPF can internally generate heat via catalytic combustion of hydrocarbons and carbon monoxide.

Finally, a supervisor (box 20) achieves a scheduling function that controls the thermal model 10 depending on the current operating mode and starts the simulations. The simulation is carried out during a preferably short lapse of time (a few seconds) in order to determine the possible evolution of the temperature in a predetermined time period following the starting point of simulation and extending during a comparatively longer simulated time period (e.g. 50 to 100 times—or more—the duration of the simulation). Accordingly, during the simulation period a plurality of predicted temperatures are preferably calculated that are indicative of the estimated temperatures that the SCR will take in the future. However in a preferred embodiment, as will be explained below, only the extrema are memorized for decision making.

For example, the simulation may be carried out during two seconds in order to simulate the temperature evolution of the SCR-catalyst during the following 200 seconds. The time period of 200 s taken into account for the simulation has been selected because for a standard internal combustion engine (3 to 6 cylinders) of an automobile, this time period is considered appropriate, having regard to the time constants of thermal inertia.

The thermal control of the SCR-catalyst may then be performed in the engine ECU by comparing the predicted temperature values to a threshold to decide whether or not to switch from one operating mode to the other (from heat-up to normal or vice-versa).

Figure 3:
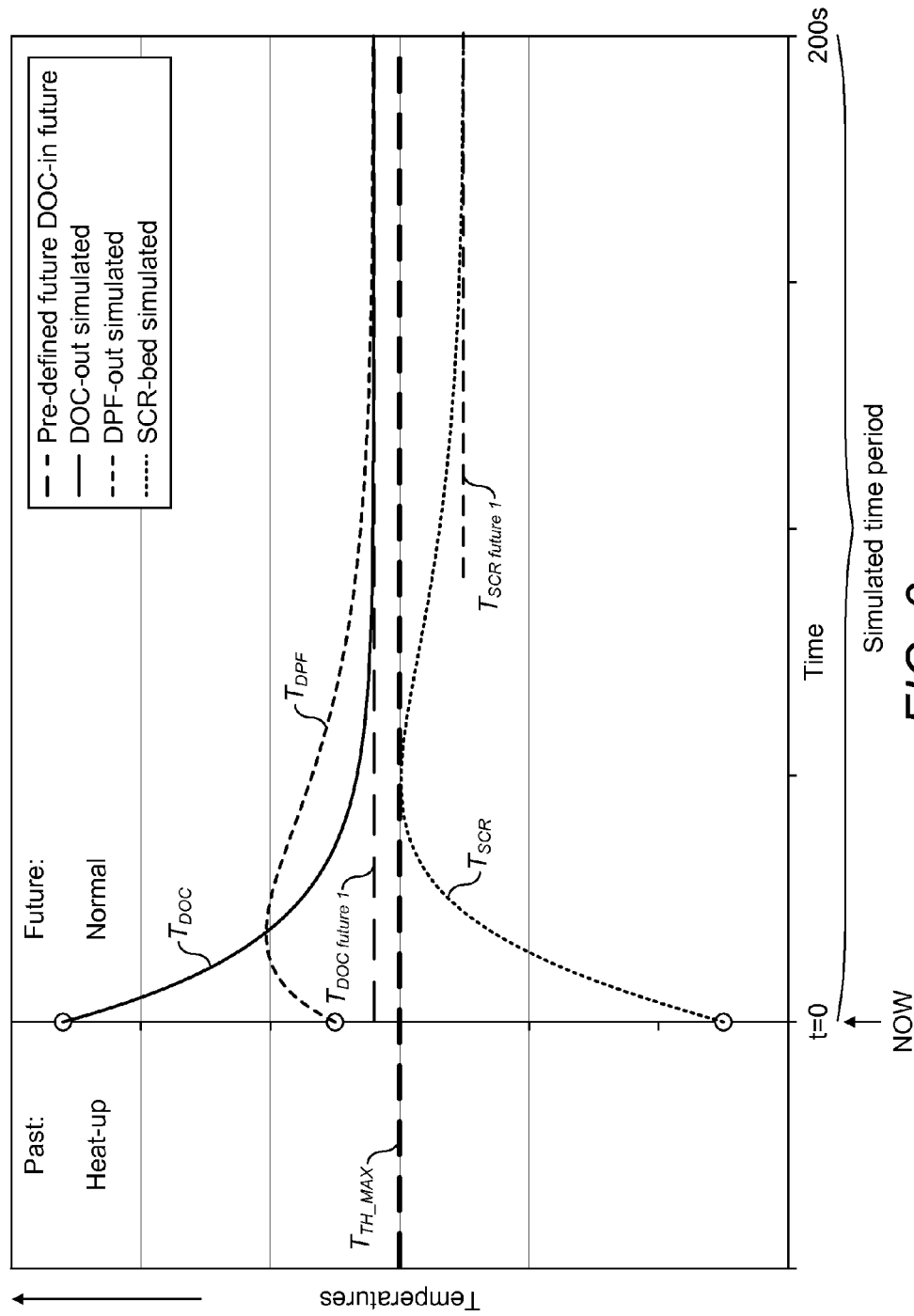
FIG. 3: is a combined graph illustrating the temperature simulation principle in accordance with the present method, when starting from heat up mode.

FIG. 3 is a principle diagram illustrating the simulation and decision making in accordance with the present method. On the left of the relative time t=0 (also indicated "now"), the current operating mode is "heat up". At t=0, a simulation is started in accordance with the thermal model of FIG. 2 that simulates the temperature of the SCR catalyst over a time period of predetermined length "simulated time period", here e.g. 200 s.

Still in FIG. 3, the dashed line indicates the so-called "maximum" decision threshold ($T_{TH\_MAX}$) for deciding whether or not the heat-up mode may be ended, while ensuring that the SCR will subsequently operate in a desired temperature range. At t=now, the temperatures correspond to the current, real temperatures of each component (DOC, DPF and SCR). On the right of the t=now line, all temperatures are simulated, supposing that the engine operating mode is switched from "heat up" to "normal" and assuming that the SCR will reach a steady state temperature $T_{SCR\ future\ 1}$ (the long term temperature associated with the normal mode).

As can be seen, the simulation reveals that $T_{SCR}$ will reach $T_{TH\_MAX}$. Therefore, the engine operating mode can be switched to normal from that moment on.

Figure 4:
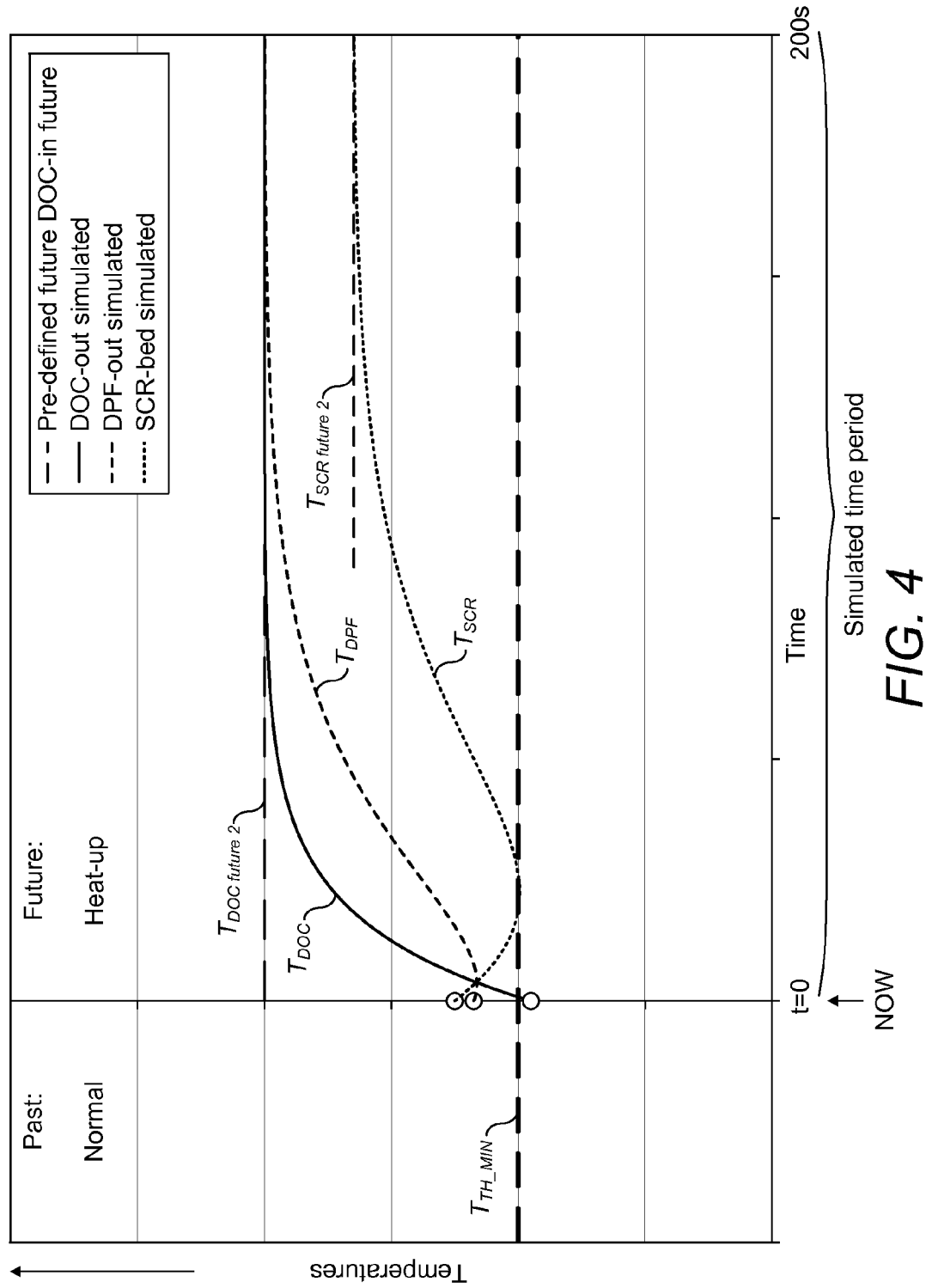
FIG. 4: is a combined graph illustrating the temperature simulation principle in accordance with the present method, when starting from normal mode.

The inverse situation will now be explained with respect to FIG. 4. At t=0 (now) the engine is currently operated in the normal mode and the current temperatures are those indicated by the points on the vertical line. On the right of the vertical line t=now, the simulated temperatures are represented for the future, simulated time period, with the hypothesis of a switch to the "heat up" mode and a long term temperature $T_{SCR\ future\ 2}$. As can be seen, if the heat up mode was entered at t=now, the SCR temperature would continue dropping down to a minimum and level off towards a steady state temperature. Detecting the minimum of the predicted temperatures allows deciding when to switch from normal to heat up. A proper selection of the minimum threshold value will avoid a sensible temperature drop of the SCR catalyst. In FIG. 4, the simulated SCR temperature drops down to the minimum threshold level indicated $T_{TH\_MIN}$, so that the mode is switched to "heat up" again.

Example: A practical embodiment of this method will now be described with reference to FIG. 5. In this example, the operating mode is "heat-up", i.e. measures are currently being taken by the ECU to generate more heat in the exhaust gas stream so as to accelerate the heating of the SCR. The horizontal axis indicates the current time (in seconds) and the vertical axis indicates the temperature. The current (real) temperature of the SCR (i.e. at the time indicated on the axis) is indicated as $T_{SCR\ feedback}$.

Every 2 s, the supervisor 20 triggers the start of a simulation to determine the temperature evolution of the SCR during a simulated time period (here 200 s) in case the mode was switched to normal. This simulation uses, as explained with respect to FIG. 2, the current temperatures of the DOC, DPF and SCR and a long-term temperature $T_{SCR\ future}$ (respectively $T_{DOC\ future}$).

Figure 5:
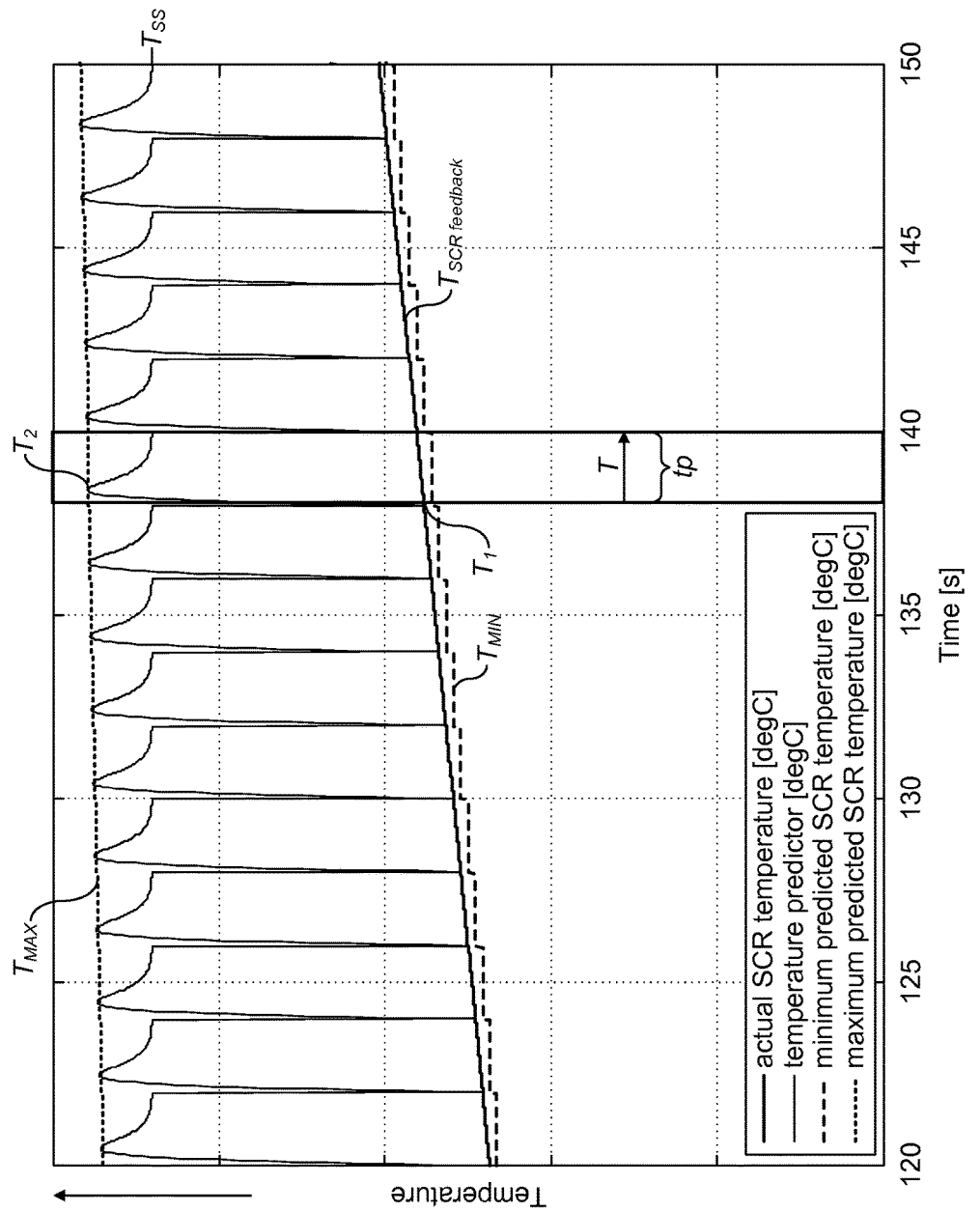
FIG. 5: is a combined graph illustrating current and predicted temperatures in accordance with a preferred embodiment of the present method.

In FIG. 5, the grey window indicates one sample simulation started at t=138 s and ending at t=140 s. The predicted temperature evolution of the SCR drawn in this window however corresponds to a simulated time period (tp) of 200 s. As can be seen, the predicted temperature varies from the current temperature ($T_1$) to about the long-term temperature ($T_{SS}$) while passing through a maximum $T_2$.

From this sample simulation it can be seen that at 138 s, considering the current temperatures of the components, the SCR may attain within the next 200 s a temperature of up to $T_2$ if the SCR operating mode was switched from heat-up to normal as a result of this simulation step (say at 140 s), this even if the current temperature of the SCR is $T_1$. In this example, the difference between the maximum SCR temperature and the current SCR temperature is high because the DOC temperature is actually also very high and thermal energy will then be transferred from the DOC to the SCR.

Hence, the fact that the predicted temperature reaches or exceeds a threshold value, here e.g. $T_2$, allows to decide the switch from heat-up to normal mode, although the SCR temperature is still low at the beginning of the simulation.

For practical reasons, the extrema of the predicted temperature during the simulation time frame (tp) are extracted and named $T_{SCR\ pred\ MAX}$ and $T_{SCR\ pred\ MIN}$. For the simulation step between 138 and 140 s, the $T_{SCR\ pred\ MAX}=T_2$ and $T_{SCR\ pred\ MIN}=T_1$.

When operating in SCR heat-up mode, the test for switching from heat-up to normal mode may then be whether $T_{SCR\ pred\ MAX}$ reaches or exceeds a predetermined threshold value, which would indicate that considering the current temperatures in the exhaust line, the SCR will attain in the future this threshold temperature if the heat-up mode was stopped.

The minimum $T_{SCR\ pred\ MIN}$ is of interest in the other case (as explained with respect to FIG. 4) where the ECU is currently not taking any heat-up measure to accelerate the heating of the SCR-catalyst, and thus operating in "normal" mode.

In such case, the question arises as to when the "heat-up" mode should be entered again, in order to avoid a drop of SCR temperature below a temperature efficient for NOx conversion (e.g. light off). In this connection, those skilled in the art will understand that due to the thermal inertia of the exhaust system, starting the heat-up mode does not prevent the SCR catalyst from falling below a predetermined temperature. Here the critical aspect is to avoid a too important drop of SCR temperature, which would happen if the heat-up mode was entered too late.

Accordingly, the simulation performed by the thermal model of FIG. 2 provides the minimum temperature $T_{SCR\ pred\ MIN}$, which corresponds to the minimum temperature that would be reached within the simulated time period representing a time period of 200 s ahead of the present time and if the SCR operating mode was then switched to "heat-up". Again, $T_{SCR\ pred\ MIN}$ may be compared to a lower temperature threshold, so that when $T_{SCR\ pred\ MIN}$ reaches or drops below that threshold, the heat-up mode is triggered.

The invention claimed is:

1. A method of operating an internal combustion engine comprising an exhaust system with first exhaust aftertreatment means and, downstream thereof, second exhaust aftertreatment means, said engine comprising an electronic control unit (ECU) configured to allow engine operation in at least one of a normal operating mode and a heat-up operating mode, the method comprising the steps of:
   determining a predicted temperature evolution of said second exhaust aftertreatment means based on a thermal model taking into account the thermal inertia of the exhaust system and having as input the current temperatures of said first and second exhaust aftertreatment means and, wherein said predicted temperature evolution of said second exhaust aftertreatment means is indicative of the temperature that the second exhaust aftertreatment means may reach during a simulated time period in case the operating mode was changed; and
   changing the operating mode depending on said predicted temperature evolution.

2. The method according to claim 1, wherein said operating mode is changed when a predicted temperature exceeds or drops below a predetermined temperature threshold.

3. The method according to claim 2, wherein an extremum of said predicted temperature evolution is compared to a respective predetermined temperature threshold.

4. The method according to claim 1, wherein said model further takes into account a thermal loss in said exhaust system.

5. The method according to claim 1, wherein said thermal model uses a predetermined long-term temperature value associated with each operating mode.

6. The method according to claim 1, wherein said thermal model comprises at least one first order lag filter model.

7. The method according to claim 1, wherein said first exhaust aftertreatment means comprises an oxidation catalyst and/or a particulate filter, and wherein said second exhaust aftertreatment means is a SCR catalyst.

8. The method according to claim 7, wherein said thermal model receives input signals indicative of the current temperature of said SCR catalyst, oxidation catalyst and said particulate filter.

9. The method according to claim 8, wherein said thermal model comprises a thermal lag model for said oxidation catalyst, a thermal lag model for said particulate filter, a thermal lag model for said SCR catalyst and a piping loss model.

10. An electronic control unit (ECU) for an internal combustion engine comprising an exhaust system with a first exhaust aftertreatment means and, downstream thereof, a second exhaust aftertreatment means, said ECU configured to allow engine operation in at least one of a normal operating mode and a heat-up operating mode, wherein:
   said ECU is configured to determine a predicted temperature evolution of said second exhaust aftertreatment means based on a thermal model taking into account the thermal inertia of the exhaust system and having as input the current temperatures of said first and second exhaust aftertreatment means and, wherein said predicted temperature evolution of said second exhaust aftertreatment means is indicative of the temperature that the second exhaust aftertreatment means may reach during a simulated time period in case the operating mode was changed; and to change the operating mode depending on said predicted temperature evolution.

11. The ECU according to claim 10, wherein said ECU switches the operating mode from heat-up to normal when a predicted temperature reaches or exceeds a predetermined upper temperature threshold.

12. The ECU according to claim 10, wherein said ECU switches the operating mode from normal to heat-up when a predicted temperature reaches or drops below a lower temperature threshold.

13. The ECU according to claim 10, wherein
   said first exhaust aftertreatment means comprises an oxidation catalyst and/or a particulate filter;
   said second exhaust aftertreatment means is a SCR catalyst;
   said thermal model comprises a thermal lag model for said oxidation catalyst, a thermal lag model for said particulate filter, a thermal lag model for said SCR catalyst and a piping loss model
   thermal model receives input signals indicative of the current temperature of said SCR catalyst, oxidation catalyst and said particulate filter.

14. The ECU according to claim 10, wherein said thermal model receives as further input a predetermined long-term temperature value associated with each operating mode of said second exhaust aftertreatment system.

* * * * *